United States Patent [19]

Stephenson, III et al.

[11] Patent Number: 5,387,956
[45] Date of Patent: Feb. 7, 1995

[54] ALTERNATIVE DIRECT AND COMBINED DIRECT-INDIRECT LIGHT REFLECTING DEVICE

[75] Inventors: Stanley W. Stephenson, III, Spencerport; Tom M. Seamans, Corfu, both of N.Y.

[73] Assignee: Eastman Kodak Company, Rochester, N.Y.

[21] Appl. No.: 198,023

[22] Filed: Feb. 17, 1994

[51] Int. Cl.⁶ ............................................. G03B 15/03
[52] U.S. Cl. ..................... 354/149.1; 354/149.11; 354/141; 362/7; 362/18
[58] Field of Search ............... 354/149.1, 149.11, 141; 362/7, 18, 3; 355/67

[56] References Cited

U.S. PATENT DOCUMENTS

| | | | |
|---|---|---|---|
| 3,982,116 | 9/1976 | Sakuma | 355/67 |
| 4,085,316 | 4/1978 | Quinn . | |
| 4,122,333 | 10/1978 | Crouse . | |
| 4,259,711 | 3/1981 | Mochizuki | 355/67 |
| 4,470,103 | 9/1984 | Krieg . | |
| 4,733,280 | 3/1988 | Irie | 355/67 |
| 4,816,875 | 3/1989 | Takeda et al. | 355/67 |
| 4,893,140 | 1/1990 | Yamamoto et al. . | |
| 5,075,720 | 12/1991 | Takeda et al. | 355/67 |

*Primary Examiner*—Monroe H. Hayes
*Attorney, Agent, or Firm*—Roger A. Fields

[57] ABSTRACT

A reflector is supported for movement between a direct flash position for reflecting light output from a source of flash illumination directly towards a subject to be photographed and an indirect flash position for reflecting light output from a source of flash illumination onto a nearby surface and thence directly towards a subject to be photographed. The reflector has an integral reflective portion that is substantially smaller than, and fixedly angled with respect to, the remainder of the reflector to reflect a substantially minor percentage of light output from a source of illumination directly towards a subject to be photographed when the reflector is in its indirect flash position, whereby combined direct and indirect illumination of a subject to be photographed can be achieved.

2 Claims, 1 Drawing Sheet

ALTERNATIVE DIRECT AND COMBINED DIRECT-INDIRECT LIGHT REFLECTING DEVICE

CROSS-REFERENCE TO RELATED APPLICATION(S)

Reference is made to commonly assigned ending application Ser. No. 180591 entitled ALTERNATIVE DIRECT AND COMBINED DIRECT-INDIRECT LIGHT REFLECTING DEVICE and filed Jan. 13, 1994, in the name of Stanley W. Stephenson III.

The cross-referenced application discloses a reflective device comprising a main light reflector supported for movement between a direct flash position for reflecting light output from a source of flash illumination directly towards a subject to be photographed and an indirect flash position for reflecting light output from the flash source onto a nearby surface and thence directly towards a subject to be photographed, and a supplementary light reflector supported for movement to a direct flash position for reflecting light output from the flash source directly towards a subject to be photographed. The supplementary reflector is moved to its direct flash position in response to movement of the main reflector to its indirect flash position, whereby combined direct and indirect illumination of a subject to be photographed can be achieved.

FIELD OF THE INVENTION

This invention relates generally to the field of photography, and in particular to a reflective device for use with a source of flash illumination for illuminating a subject to be photographed. More specifically, the invention relates to an alternative direct and combined direct-indirect light reflecting device.

BACKGROUND OF THE INVENTION

It is conventional today to use a source of flash illumination with a camera during picture-taking in low light conditions. Typically, a flash reflector is located on the camera in a direct flash position for reflecting light output from the source of flash illumination directly or nearly directly towards a subject to be photographed. The flash reflector may be pivotable from its direct flash position to an indirect or bounce flash position for reflecting light output from the source of flash illumination towards a nearby surface such as a ceiling and thence directly towards the subject.

Prior art U.S. Pat. No. 4,085,316, issued Apr. 18, 1978, U.S. Pat. No. 4,122,333, issued Oct. 24, 1978, and U.S. Pat. No. 4,470,103, issued Sep. 4, 1984, each suggest that more pleasing photographs can be obtained in low light conditions when there is simultaneous direct and bounce flash illumination of the subject. For example, in the '333 patent there is disclosed a reflective device for providing either bounce flash illumination or simultaneous direct and bounce flash illumination, and in the '103 patent there is disclosed a reflective device for providing either direct flash illumination or simultaneous direct and bounce flash illumination. Conversely, in the '316 patent there is disclosed a light diffusing device for providing only simultaneous direct and bounce flash illumination.

PROBLEM(S) TO BE SOLVED BY THE INVENTION

Clearly, it is advantageous to alternatively provide direct flash illumination and combined direct and bounce flash illumination as in the '103 patent, rather than to alternatively provide bounce flash illumination and combined direct and bounce flash illumination as in the '333 patent, or to only provide combined direct and bounce flash illumination as in the '316 patent. However, in the '103 patent, when combined direct and bounce flash illumination is provided, a larger portion of an elliptical reflector must be pivotally separated from a smaller portion of the reflector to effect respective spaced portions of the reflector for the two types of flash illumination. This is a mechanically complicated, and therefore relatively expensive, approach.

SUMMARY OF THE INVENTION

According to the invention a reflector supported for movement between a direct flash position for reflecting light output from a source of flash illumination directly towards a subject to be photographed and an indirect flash position for reflecting light output from a source of flash illumination onto a nearby surface and thence directly towards a subject to be photographed, is characterized in that:

the reflector has an integral reflective portion that is substantially smaller than, and fixedly angled with respect to, the remainder of the reflector to reflect a substantially minor percentage of light output from a source of illumination directly towards a subject to be photographed when the reflector is in its indirect flash position, whereby combined direct and indirect illumination of a subject to be photographed can be achieved.

ADVANTAGEOUS EFFECT(S) OF THE INVENTION

The invention more simply provides combined direct and indirect illumination of a subject as compared to the two-part reflector disclosed in the '103 patent.

DETAILED DESCRIPTION OF THE INVENTION

The invention is disclosed as being embodied preferably in an electronic flash unit built into or attached to a non single-lens reflex (NSLR) 35 mm camera. Because the features of this type of flash unit are generally known, the description which follows is directed in particular only to those elements forming part of or cooperating directly with the disclosed embodiment. It is to be understood, however, that other elements not disclosed may take various forms known to a person of ordinary skill in the art.

Figure 1:
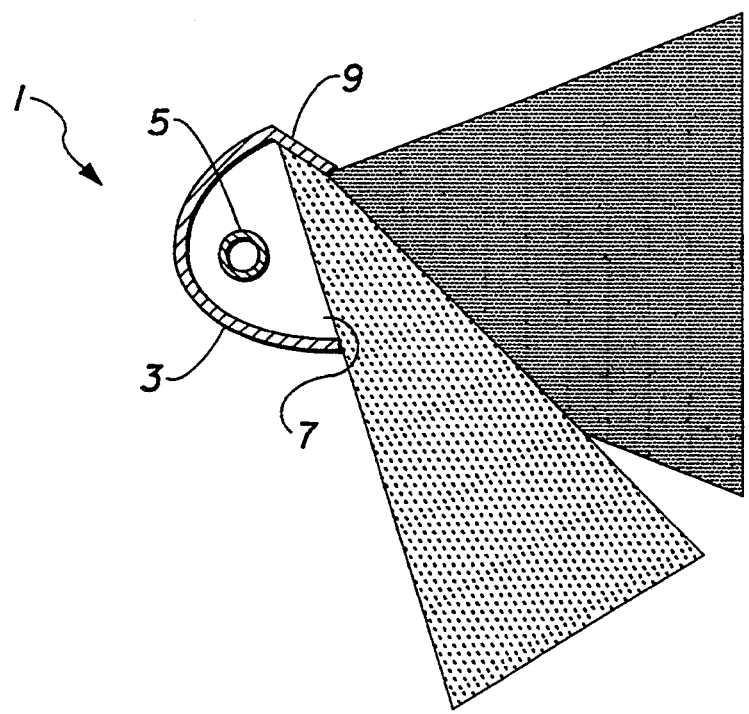
FIG. 1 is a side elevation view in section of an alternative direct and combined direct-indirect light reflecting device according to a preferred embodiment of the invention, showing the light reflecting device in a direct reflecting mode of operation.
Figure 2:
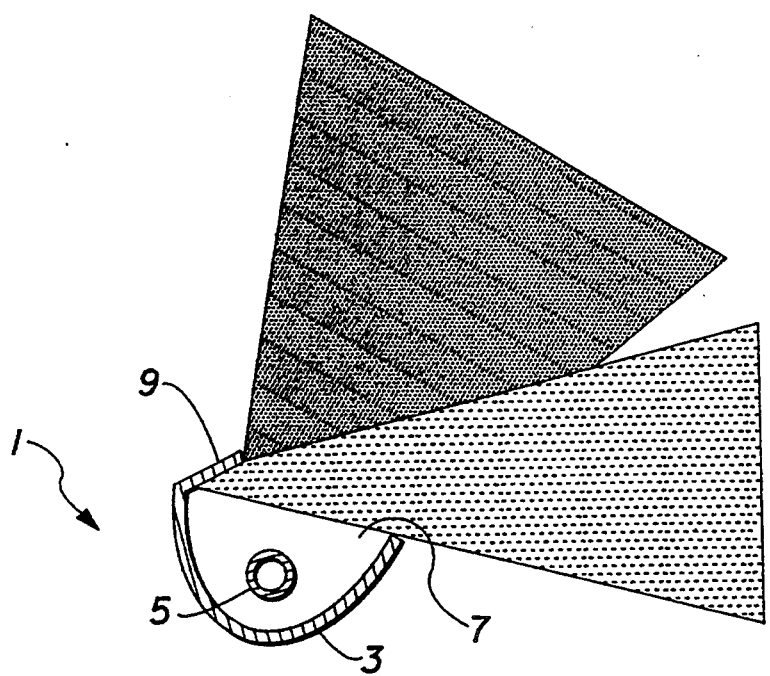
FIG. 2 is a side elevation view in section similar to FIG. 1, showing the light reflecting device in a combined direct-indirect reflecting mode of operation.

Referring now to the drawings, FIGS. 1 and 2 schematically depict a reflective device 1 for an electronic flash unit (not shown). The reflective device 1 is a silvered, nominally parabolic or trough-shaped, reflector 3. As is conventional, a flash tube 5 is mounted within the reflector 3 at its closed rear to provide flash illumination which is reflected outwardly through a front opening 7 or window of the reflector. The front opening 7 may be covered by a known light diffusing element or the equivalent (not shown). Other components of the flash unit (not shown) include a power supply, a capacitor, and a triggering circuit. A known flash circuit is disclosed in U.S. Pat. No. 4,893,140, issued Jan. 9, 1990.

The reflector 1 is supported via a known pivot mounting (not shown) for movement between a direct flash position, shown in FIG. 1, for reflecting light output from the flash tube 5 directly or nearly directly towards a subject to be photographed and an indirect flash position, shown in FIG. 2, for reflecting light output from the flash tube onto a nearby surface such as a ceiling and thence directly towards the subject.

An integral reflective portion of the reflector 1, preferably an inwardly forward bent tip 9 of the reflector, is located adjacent the front opening 9 of the reflector and is continuously (fixedly) angled with respect to the remainder of the reflector to reflect a substantially minor percentage, e.g. 3–15%, of light output from the flash tube 5 directly or nearly directly towards a subject to be photographed when the reflector is in its indirect flash position, shown in FIG. 2, and to reflect the same percentage of light output towards the ground or otherwise away from the subject when the reflector is in its direct flash position, shown in FIG. 1. Thus, when the reflector 3 is in its direct flash position, combined indirect illumination of the subject occurs.

The invention has been described with reference to a preferred embodiment. However, it will be appreciated that variations and modifications can be effected by a person of ordinary skill in the art without departing from the scope of the invention.

PARTS LIST FOR FIGS. 1–2

1. reflective device
3. parabolic reflector
5. flash tube
7. front opening
9. reflector bent tip

What is claimed is:

1. A reflector supported for movement between a direct flash position for reflecting light output from a source of flash illumination directly towards a subject to be photographed and an indirect flash position for reflecting light output from a source of flash illumination onto a nearby surface and thence directly towards a subject to be photographed, is characterized in that:

said reflector has integral reflective means that is substantially smaller than, and fixedly angled with respect to, the remainder of the reflector for reflecting a substantially minor percentage of light output from a source of illumination in a different direction than said remainder of the reflector reflects a major percentage of light output from the source of flash illumination regardless of whether the reflector is in its direct or indirect flash position, whereby combined direct and indirect illumination of a subject to be photographed can be achieved.

2. A reflector supported for movement between a direct flash position for reflecting light output from a source of flash illumination directly towards a subject to be photographed and an indirect flash position for reflecting light output from a source of flash illumination onto a nearby surface and thence directly towards a subject to be photographed, is characterized in that:

said reflector has an integral reflective portion that is substantially smaller than, and fixedly angled with respect to, the remainder of the reflector to reflect a substantially minor percentage of light output from a source of flash illumination directly towards a subject to be photographed when the reflector is in its indirect flash position, whereby combined direct and indirect illumination of a subject to be photographed can be achieved.

* * * * *